(12) United States Patent
Taguchi et al.

(10) Patent No.: US 10,746,906 B2
(45) Date of Patent: Aug. 18, 2020

(54) HALF MIRROR AND MIRROR WITH IMAGE DISPLAY FUNCTION

(71) Applicant: FUJIFILM Corporation, Tokyo (JP)

(72) Inventors: Takao Taguchi, Minamiashigara (JP); Kazuhiro Oki, Minamiashigara (JP); Mitsuyoshi Ichihashi, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 265 days.

(21) Appl. No.: 16/034,889

(22) Filed: Jul. 13, 2018

(65) Prior Publication Data

US 2018/0335551 A1 Nov. 22, 2018

Related U.S. Application Data

(63) Continuation of application No. PCT/JP2017/000448, filed on Jan. 10, 2017.

(30) Foreign Application Priority Data

Jan. 29, 2016 (JP) ................................ 2016-015536

(51) Int. Cl.
*G02B 5/08* (2006.01)
*G09F 9/00* (2006.01)
(Continued)

(52) U.S. Cl.
CPC ............. *G02B 5/0816* (2013.01); *G02B 5/08* (2013.01); *G02B 5/30* (2013.01); *G02B 5/3016* (2013.01);
(Continued)

(58) Field of Classification Search
None
See application file for complete search history.

(56) References Cited

U.S. PATENT DOCUMENTS 6,710,831 B1 * 3/2004 Winker ............. G02F 1/133553
349/115
2005/0266158 A1 * 12/2005 Pokorny ............. G02B 5/3016
427/162
(Continued)

FOREIGN PATENT DOCUMENTS

EP 1517162 A1 3/2005
EP 2407820 A1 1/2012
(Continued)

OTHER PUBLICATIONS

European Office Communication for corresponding European Application No. 17743914.8, dated Dec. 3, 2019.
(Continued)

*Primary Examiner* — Jennifer D. Carruth
(74) *Attorney, Agent, or Firm* — Birch, Stewart, Kolasch & Birch, LLP

(57) ABSTRACT

The half mirror includes a retardation layer, a circularly polarized light reflecting layer, and a front panel that are disposed in this order. The retardation layer has a front phase difference as measured at a wavelength of 500 nm of 107 to 127 nm and a front phase difference as measured at a wavelength of 475 nm of 110 to 130 nm. The circularly polarized light reflecting layer includes three cholesteric liquid crystal layers. The three cholesteric liquid crystal layers have different selective reflection center wavelengths λ1, λ2, and λ3. The center wavelengths λ1, λ2, and λ3 satisfy 380 nm<λ1<500 nm and 520 nm<λ2<λ3<780 nm. The cholesteric liquid crystal layer having the center wavelength λ1 is disposed nearest to the front panel side.

17 Claims, 1 Drawing Sheet

(51) Int. Cl.
*G02B 5/30* (2006.01)
*G02B 27/28* (2006.01)
*G02F 1/1335* (2006.01)

(52) U.S. Cl.
CPC ......... *G02B 5/3083* (2013.01); *G02B 27/283* (2013.01); *G09F 9/00* (2013.01); *G02F 2001/133541* (2013.01); *G02F 2001/133543* (2013.01); *G02F 2001/133562* (2013.01)

(56) References Cited

U.S. PATENT DOCUMENTS

| | | |
|---|---|---|
| 2006/0244872 A1 | 11/2006 | Kim et al. |
| 2016/0170114 A1 | 6/2016 | Watano et al. |
| 2016/0318845 A1 | 11/2016 | Katoh et al. |
| 2016/0349573 A1 | 12/2016 | Ohmuro et al. |
| 2017/0203693 A1 | 7/2017 | Oishi |

FOREIGN PATENT DOCUMENTS

| | | |
|---|---|---|
| EP | 3229049 A1 | 10/2017 |
| EP | 3321719 A1 | 5/2018 |
| JP | 2002-229494 A | 8/2002 |
| JP | 2004-184490 A | 7/2004 |
| JP | 2004-184491 A | 7/2004 |
| JP | 2011-45427 A | 3/2011 |
| JP | 2014-201146 A | 10/2014 |
| WO | WO 2015/029958 A1 | 3/2015 |
| WO | WO 2015/098906 A1 | 7/2015 |
| WO | WO 2015/115390 A1 | 8/2015 |
| WO | WO 2015/125908 A1 | 8/2015 |
| WO | WO 20151186297 A1 | 12/2015 |

OTHER PUBLICATIONS

Extended European Search Report for corresponding European Application No. 17743914.8, dated Dec. 19, 2018.
Japanese Notification of Reasons for Refusal for corresponding Japanese Application No. 2016-015536, dated Jan. 15, 2019, with English translation.
International Preliminary Report on Patentability and Written Opinion of the International Searching Authority (Forms PCT/IB/326, PCT/IB/373 and PCT/ISA/237) for International Application No. PCT/JP2017/000448, dated Aug. 9, 2018, with English translation.
International Search Report (Form PCT/ISA/210) for International Application No. PCT/JP2017/000448, dated Apr. 11, 2017, with English translation.
Chinese Office Action for corresponding Chinese Application No. 201780007691.X, dated Jan. 20, 2020, with English translation.

* cited by examiner

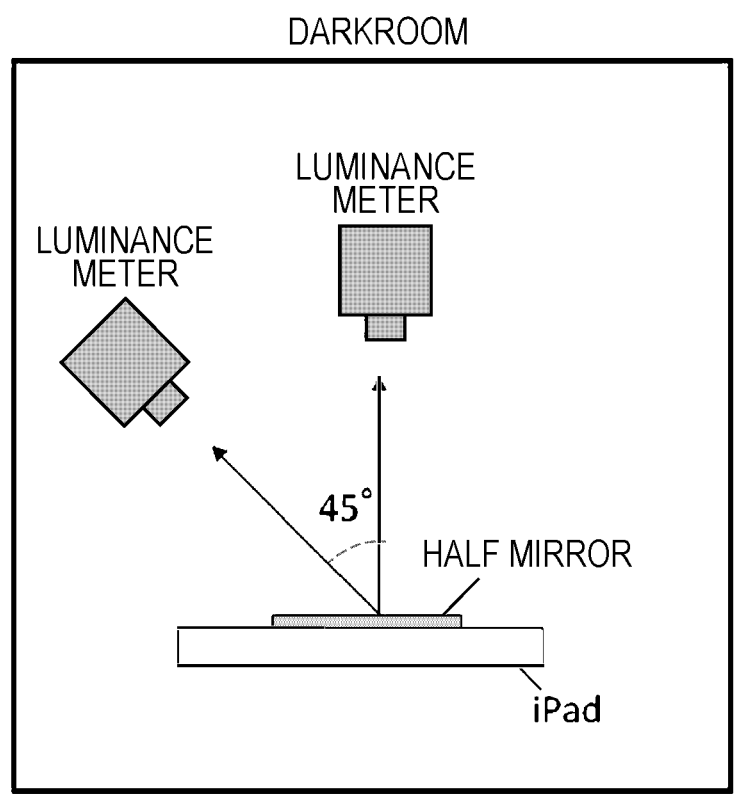

HALF MIRROR AND MIRROR WITH IMAGE DISPLAY FUNCTION

CROSS-REFERENCE TO RELATED APPLICATIONS

This application is a Continuation of PCT International Application No. PCT/JP2017/000448 filed on Jan. 10, 2017, which claims priority under 35 U.S. § 119(a) to Japanese Patent Application No. 2016-015536 filed on Jan. 29, 2016. Each of the above application(s) is hereby expressly incorporated by reference, in its entirety, into the present application.

BACKGROUND OF THE INVENTION

1. Field of the Invention

The present invention relates to a half mirror and a mirror with an image display function.

2. Description of the Related Art

For example, JP2002-229494A, JP2014-201146A, and JP2011-45427A disclose mirrors with image display functions. The mirrors each include a half mirror provided on the surface of the image display unit of an image display device. In display mode, the mirrors display images, and in non-display mode, such as when the image display device is turned off, the mirrors serve as mirrors and display mirror-reflected images.

SUMMARY OF THE INVENTION

When a half mirror is disposed on the image display unit of an image display device, part of light for image display may fail to pass through the half mirror, thus leading to dark images. When a half mirror is disposed on the image display unit of an image display device, the quality of images may be reduced due to, for example, changes in the shade of the images under the influence of the optical properties of the half mirror itself. Neither JP2002-229494A nor JP2014-201146A focuses on these problems. On the other hand, JP2011-45427A describes using a reflective polarizing plate as a half mirror and aligning linearly polarized light emitted from the image display device with the transmission axis of the reflective polarizing plate to prevent light loss and further improve the quality of images. However, such a configuration in which a reflective polarizing plate is used as a half mirror may disadvantageously create a direction in which images and mirror-reflected images cannot be observed through polarizing sunglasses.

An object of the present invention is to provide a mirror with an image display function that allows displayed images and mirror-reflected images to be observed without direction dependency even through polarizing sunglasses and that is capable of displaying images that are bright and have good shades. Another object of the present invention is to provide a half mirror that provides such a mirror with an image display function.

To solve the above problems, the inventors studied the use of a cholesteric liquid crystal layer for a half mirror. This is because the use of a cholesteric liquid crystal layer having circularly polarized light reflectivity allows displayed images and mirror-reflected images to be observed without direction dependency even through polarizing sunglasses. The inventors further discovered that disposing a predetermined quarter-wave plate (retardation layer) between the cholesteric liquid crystal layer and an image display device enables the use of linearly polarized light emitted from the image display device without loss. However, another problem was encountered; with such a configuration, the change in shade was noticeable when an image was obliquely observed. The inventors have further studied to solve this problem, thereby completing the present invention.

Thus, the present invention provides [1] to [10] below.

[1] A half mirror including a retardation layer, a circularly polarized light reflecting layer, and a front panel that are disposed in this order,
wherein the retardation layer has a front phase difference as measured at a wavelength of 500 nm of 107 to 127 nm and a front phase difference as measured at a wavelength of 475 nm of 110 to 130 nm,
the circularly polarized light reflecting layer includes three cholesteric liquid crystal layers,
the three cholesteric liquid crystal layers have different selective reflection center wavelengths $\lambda 1$, $\lambda 2$, and $\lambda 3$,
the center wavelengths $\lambda 1$, $\lambda 2$, and $\lambda 3$ satisfy 380 nm<$\lambda 1$<500 nm and 520 nm<$\lambda 2$<$\lambda 3$<780 nm, and
the cholesteric liquid crystal layer having the center wavelength $\lambda 1$ is disposed nearest to the front panel side.

[2] The half mirror according to [1], wherein the center wavelength $\lambda 1$ satisfies 380 nm<$\lambda 1$<465 nm.

[3] The half mirror according to [1] or [2], wherein a value of $(0.615 X_{475} + 0.763 X_{480} - 0.900 X_{485} + 1.071 X_{490} + 1.335 X_{495} + 1.671 X_{500})/100$ is 1.5% or less, wherein $X_{475}$, $X_{480}$, $X_{485}$, $X_{490}$, $X_{495}$, and $X_{500}$ are reflectances at wavelengths of 475 nm, 480 nm, 485 nm, 490 nm, 495 nm, and 500 nm, respectively.

[4] The half mirror according to any one of [1] to [3], wherein reflectances at the center wavelengths $\lambda 1$, $\lambda 2$, and $\lambda 3$ are each 35% or more.

[5] The half mirror according to any one of [1] to [4], wherein the circularly polarized light reflecting layer and the retardation layer are in direct contact with each other.

[6] The half mirror according to any one of [1] to [5], wherein the three cholesteric liquid crystal layers are each in direct contact with their adjacent cholesteric liquid crystal layers.

[7] The half mirror according to any one of [1] to [6], wherein the front panel is a glass plate or a plastic film having a front phase difference of less than 10 nm, and the circularly polarized light reflecting layer and the front panel are bonded together with an adhesive layer interposed therebetween.

[8] The half mirror according to any one of [1] to [7], wherein the circularly polarized light reflecting layer includes a cholesteric liquid crystal layer having a selective reflection center wavelength in the infrared range.

[9] A mirror with an image display function, including the half mirror according to any one of [1] to [8] and an image display device, wherein the image display device, the retardation layer, the circularly polarized light reflecting layer, and the front panel are disposed in this order.

[10] The mirror with an image display function according to [9], wherein the image display device and the retardation layer are bonded together with an adhesive layer interposed therebetween.

The present invention provides a mirror with an image display function that is capable of displaying images that are bright and have good shades and also provides a half mirror that provides such a mirror with an image display function. Images displayed by the mirror with an image display function according to the present invention undergo little change in shade when obliquely observed. In addition, the mirror with an image display function according to the present invention is advantageous in that displayed images and mirror-reflected images can be observed without direction dependency even through polarizing sunglasses.

BRIEF DESCRIPTION OF THE DRAWING

FIG. 1 illustrates the optical system used in examples.

DESCRIPTION OF THE PREFERRED EMBODIMENTS

The present invention will now be described in detail.

In this specification, the expression "... to ..." is meant to include the numerical values before and after "to" as the lower and upper limits. In this specification, expressions related to angles, such as "45°", "parallel", "perpendicular", and "orthogonal", imply that the difference from the exact angle is less than 5 degrees unless otherwise specified. The difference from the exact angle is preferably less than 4 degrees, more preferably less than 3 degrees.

In this specification, the term "(meth)acrylate" is used to mean "one or both of acrylate and methacrylate".

In this specification, when the term "selective" is used in relation to circular polarization, it means that the light quantity of one of the right-handed circularly polarized component and the left-handed circularly polarized component is greater than the light quantity of the other. Specifically, when the term "selective" is used, the degree of circular polarization of light is preferably 0.3 or more, more preferably 0.6 or more, still more preferably 0.8 or more, further still more preferably substantially 1.0. The degree of circular polarization is a value expressed by $|I_R-I_L|/(I_R+I_L)$ where $I_R$ is an intensity of the right-handed circularly polarized component of light, and $I_L$ is an intensity of the left-handed circularly polarized component.

In this specification, when the term "sense" is used in relation to circular polarization, it means that the circular polarization is right-handed or left-handed. The sense of circular polarization is defined as follows: when light is viewed such that it travels toward the viewer, if the end point of an electric field vector circulates clockwise with time, the circular polarization is right-handed, and if the end point circulates counterclockwise, the circular polarization is left-handed.

In this specification, the term "sense" may be used for the twisted direction of the helix of a cholesteric liquid crystal. When the twisted direction (sense) of the helix of a cholesteric liquid crystal is right, right-handed circularly polarized light is reflected, and left-handed circularly polarized light is transmitted. When the sense is left, left-handed circularly polarized light is reflected, and right-handed circularly polarized light is transmitted. In this specification, circularly polarized light selective reflection that is a phenomenon where a cholesteric liquid crystal layer selectively reflects right-handed circularly polarized light or left-handed circularly polarized light is also referred to as "selective reflection".

Visible light is electromagnetic radiation (light) having wavelengths visible to the human eye and has wavelengths of 380 nm to 780 nm. Infrared radiation (infrared light) is electromagnetic radiation with wavelengths longer than those of visible light and shorter than those of radio waves. Among the types of infrared radiation, electromagnetic radiation having wavelengths of 780 nm to 2,500 nm is near-infrared light.

In this specification, when the term "image" is used in relation to a mirror with an image display function, it means an image that can be visually observed from the front panel side when the image is displayed in the image display unit of an image display device. In this specification, when the term "mirror-reflected image" is used in relation to a mirror with an image display function, it means an image that can be visually observed from the front panel side when no image is displayed in the image display unit of an image display device.

In this specification, values of front phase difference are measured using an AxoScan available from Axometrix. Values of front phase difference may also be measured using a KOBRA 21ADH or KOBRA WR (available from Oji Scientific Instruments) by casting light having a wavelength such as the selective reflection center wavelength of a cholesteric liquid crystal layer (wavelength in the visible wavelength range) in the film normal direction. The measurement wavelength can be selected by manually changing a wavelength selective filter, or the measured value can be converted, for example, by using a program. In this specification, front phase difference may also be referred to as "Re".

In this specification, the "reflectance" at a predetermined wavelength means a reflectance measured using a spectrophotometer at a wavelength set to a predetermined value. For example, reflectances at various wavelengths can be measured using a V-670 spectrophotometer (available from JASCO Corporation).

Half Mirror

A half mirror according to the present invention includes a front panel, a circularly polarized light reflecting layer, and a retardation layer that are disposed in this order. The half mirror may include another layer such as an adhesive layer and may include another reflecting layer. In this specification, a surface of the front panel facing away from the circularly polarized light reflecting layer may be referred to as the "front".

The circularly polarized light reflecting layer and the retardation layer are preferably stacked on each other with their major surface areas being the same. In this specification, the term "main surface" refers to a surface (a front or rear surface) of a plate-like or film-like member. The area of the major surface of the front panel may be larger than, equal to, or smaller than the area of the major surface of the circularly polarized light reflecting layer. The circularly polarized light reflecting layer may be bonded to a part of the major surface of the front panel, and another reflecting layer such as metal foil may be bonded to or formed on the other part. Such a configuration enables an image display at a part of the mirror. Alternatively, the circularly polarized light reflecting layer may be bonded to the entire major surface of the front panel.

In a mirror with an image display function, a half mirror having a major surface with an area equal to that of the image display unit of an image display device may be used, or a half mirror having a major surface with an area larger or smaller than that of the image display unit of the image display device may be used. By the choice of such a relation, the proportion and position of the image display unit surface relative to the entire surface of the mirror can be adjusted.

The half mirror may further have a plurality of glass plates to form a glass laminate. One of the glass plates of the glass laminate may serve as the front panel, and the circularly polarized light reflecting layer and the retardation layer may be included as an interlayer between the plurality of glass plates.

The half mirror may have any thickness, but the thickness is preferably 100 µm to 20 mm, more preferably 200 µm to 15 mm, still more preferably 300 µm to 10 mm.

The half mirror is preferably plate-like or film-like and may have a curved surface. The half mirror may be flat or curved. Such a curved half mirror can be fabricated using a curved front panel.

Circularly Polarized Light Reflecting Layer

When the half mirror is used for a mirror with an image display function, the circularly polarized light reflecting layer, at the time of displaying an image, functions to transmit the light emitted from an image display device to thereby display the image on the front of the mirror with an image display function, whereas not at the time of displaying an image, the circularly polarized light reflecting layer functions to reflect at least part of incident light from the front so that the front of the mirror with an image display function serves as a mirror.

Through the use of the circularly polarized light reflecting layer for the half mirror, the mirror with an image display function according to the present invention is able to reflect incident light from the front as circularly polarized light and transmit incident light from an image display device as circularly polarized light. Thus, the mirror with an image display function according to the present invention, even through polarizing sunglasses, allows the observation of displayed images and mirror-reflected images regardless of the relation between the transmission axis direction of the polarizing sunglasses and the horizontal direction of the mirror with an image display function.

The circularly polarized light reflecting layer includes at least three cholesteric liquid crystal layers. The circularly polarized light reflecting layer may include four or more cholesteric liquid crystal layers. The circularly polarized light reflecting layer may include another layer such as an alignment layer in addition to the cholesteric liquid crystal layers. Preferably, the circularly polarized light reflecting layer is composed solely of cholesteric liquid crystal layers. The plurality of cholesteric liquid crystal layers are preferably each in direct contact with their adjacent cholesteric liquid crystal layers.

The thickness of the circularly polarized light reflecting layer is preferably in the range of 2.0 µm to 300 µm, more preferably in the range of 8.0 µm to 200 µm.

Cholesteric Liquid Crystal Layer

In this specification, a cholesteric liquid crystal layer means a layer in which a cholesteric liquid crystalline phase is immobilized. The cholesteric liquid crystal layer may be referred to simply as the liquid crystal layer.

The cholesteric liquid crystalline phase is known to exhibit circularly polarized light selective reflection, that is, to selectively reflect circularly polarized light of one sense, either right-handed circularly polarized light or left-handed circularly polarized light, and selectively transmit circularly polarized light of the opposite sense in a specific wavelength range.

As films that exhibit circularly polarized light selective reflection and include layers in which the cholesteric liquid crystalline phase is immobilized, many films formed of compositions containing polymerizable liquid crystal compounds have been conventionally known. Examples of layers in which the cholesteric liquid crystalline phase is immobilized can be found in the related art.

The cholesteric liquid crystal layer may be any layer which contains a liquid crystal compound and in which the alignment of the cholesteric liquid crystalline phase is maintained. Typically, a polymerizable liquid crystal compound is brought into the state of cholesteric liquid crystalline phase alignment and then polymerized, for example, by ultraviolet irradiation or heating, whereby the compound is cured to form a layer having no fluidity. At the same time, the cholesteric liquid crystal layer may be any layer whose state of alignment is not changed by an external field or external force. In the cholesteric liquid crystal layer, it is only necessary that the optical properties of the cholesteric liquid crystalline phase be maintained in the layer, and the liquid crystal compound in the layer need not exhibit liquid crystallinity. For example, the polymerizable liquid crystal compound may lose its liquid crystallinity as a result of an increase in molecular weight due to curing reaction.

The cholesteric liquid crystal layer has a selective reflection center wavelength $\lambda$ that depends on the pitch P (=helical period) of the helical structure in a cholesteric phase and that satisfies the relation $\lambda = n \times P$ where n is an average refractive index of the cholesteric liquid crystal layer.

The selective reflection center wavelength and the half-width of the cholesteric liquid crystal layer can be determined as described below. In this specification, the selective reflection center wavelength means a center wavelength measured in the normal direction of a cholesteric liquid crystal layer.

When the reflection spectrum of a cholesteric liquid crystal layer is measured using a V-670 spectrophotometer (Shimadzu Corporation), a reflection peak is observed in a selective reflection band. Of two wavelengths at the reflectance at half the maximum reflection peak, the wavelength at the short wavelength side is referred to as $\lambda_l$ (nm), and the wavelength at the long wavelength side as $\lambda_h$ (nm). The selective reflection center wavelength and the half-width are expressed by the following formulae.

$$\text{Selective reflection center wavelength} = (\lambda_l + \lambda_h)/2$$

$$\text{Half-width} = (\lambda_h - \lambda_l)$$

The reflection spectrum is obtained by applying light at an angle of +5° from the normal direction of the cholesteric liquid crystal layer and observing the cholesteric liquid crystal layer from the specular direction (−5° from the normal direction). The thus-obtained selective reflection center wavelength $\lambda$ of the cholesteric liquid crystal layer is usually in agreement with a wavelength at the centroid of a reflection peak in a circular polarization reflection spectrum measured from the normal direction of the cholesteric liquid crystal layer.

As can be seen from the above formula $\lambda = n \times P$, the selective reflection center wavelength can be adjusted by adjusting the pitch of the helical structure. By adjusting the n value and the P value, the center wavelength $\lambda$ can be adjusted in order to selectively reflect either right-handed circularly polarized light or left-handed circularly polarized light when light having a given wavelength is received.

When light is obliquely incident on the cholesteric liquid crystal layer, the selective reflection center wavelength shifts to the short wavelength side. Thus, n×P is preferably adjusted such that $\lambda$ calculated according to the formula $\lambda = n \times P$ is longer than the selective reflection wavelength required for image display. When a selective reflection center wavelength, as measured when a light beam passes through a cholesteric liquid crystal layer having a refractive index $n_2$ at an angle $\theta_2$ from the normal direction of the cholesteric liquid crystal layer (the direction of the helical axis of the cholesteric liquid crystal layer), is referred to as $\lambda_d$, $\lambda_d$ is expressed by the following formula.

$\lambda_d = n_2 \times P \times \cos\theta_2$

By designing the selective reflection center wavelengths of the cholesteric liquid crystal layers included in the circularly polarized light reflecting layer taking into account the foregoing, the decrease in image visibility at oblique angles can be prevented.

The pitch of the cholesteric liquid crystalline phase depends on the type or concentration of a chiral agent used with the polymerizable liquid crystal compound, and thus the desired pitch can be achieved by adjusting these conditions. The sense and the pitch of a helix can be measured by using the methods described in page 46 of "Ekisho Kagaku Jikken Nyumon (Introduction of Liquid Crystal Science Experiments)" edited by The Japanese Liquid Crystal Society, published by SIGMA SHUPPAN, 2007 and page 196 of "Handbook of Liquid Crystals" edited by the Editorial Board of the Handbook of Liquid Crystals, published by Maruzen Co., Ltd.

In the half mirror according to the present invention, the circularly polarized light reflecting layer includes cholesteric liquid crystal layers having different selective reflection center wavelengths $\lambda 1$, $\lambda 2$ and $\lambda 3$. $\lambda 1$, $\lambda 2$ and $\lambda 3$ satisfy the relations 380 nm<$\lambda 1$<500 nm and 520 nm<$\lambda 2$<$\lambda 3$<780 nm. $\lambda 1$ is more preferably less than 470 nm, still more preferably less than 465 nm.

Preferably, $\lambda 2$ is in the green light wavelength range, and $\lambda 3$ is in the red light wavelength range. Specifically, $\lambda 2$ is preferably any wavelength in the range of 530 nm to 580 nm, and $\lambda 3$ is preferably any wavelength in the range of 580 nm to 700 nm.

Preferably, the reflectances at the wavelengths $\lambda 1$, $\lambda 2$ and $\lambda 3$ of the half mirror according to the present invention are all 35% or more. This is because bright mirror-reflected images can be provided.

More preferably, the reflectances are all 40% or more, still more preferably 45% or more.

Among the three cholesteric liquid crystal layers of the half mirror according to the present invention, the cholesteric liquid crystal layer having the selective reflection center wavelength $\lambda 1$ is disposed nearest to the front panel side. Disposing the cholesteric liquid crystal layer having the shortest selective reflection center wavelength among the selective reflection center wavelengths $\lambda 1$, $\lambda 2$ and $\lambda 3$ nearest to the front panel side enables an optical design that causes less change in shade when an image is obliquely observed, as described later.

Preferably, the cholesteric liquid crystal layer having the selective reflection center wavelength $\lambda 1$ is in direct contact with the front panel or bonded to the front panel.

More preferably, the cholesteric liquid crystal layer having the center wavelength $\lambda 1$, the cholesteric liquid crystal layer having the center wavelength $\lambda 2$, and the cholesteric liquid crystal layer having the center wavelength $\lambda 3$ are disposed in this order from the front panel side.

To prevent the change in the shade of mirror-reflected images, the circularly polarized light reflecting layer may include a cholesteric liquid crystal layer having a selective reflection center wavelength in the infrared range. In this case, the selective reflection center wavelength in the infrared range is specifically in the range of 780 to 900 nm, preferably 780 to 850 nm. If such a cholesteric liquid crystal layer having a selective reflection center wavelength in the infrared range is provided, it is preferably disposed nearer to the image display device side (retardation layer side) than all the cholesteric liquid crystal layers having selective reflection center wavelengths at $\lambda 1$, $\lambda 2$ and $\lambda 3$ described below.

By adjusting the selective reflection center wavelengths of the cholesteric liquid crystal layers for use according to the emission wavelength range of an image display device and the conditions for use of the circularly polarized light reflecting layer, bright images can be displayed with good light use efficiency. Specific examples of the conditions for use of the circularly polarized light reflecting layer include the angle of light incidence on the circularly polarized light reflecting layer and the direction of image observation.

Each cholesteric liquid crystal layer has either a right-handed or left-handed helical sense. The sense of reflected circularly polarized light of each cholesteric liquid crystal layer is in agreement with its helical sense. The helical senses of the plurality of cholesteric liquid crystal layers are preferably all the same. The helical sense in this case may be determined, for each cholesteric liquid crystal layer, depending on the sense of circularly polarized light included in a larger quantity in the light that has just passed through the retardation layer after exiting the image display device. Specifically, it is preferable to use cholesteric liquid crystal layers having helical senses that transmit circularly polarized light having a sense included in a larger quantity in the light that has just passed through the retardation layer after exiting the image display device.

The half-width $\Delta\lambda$ (nm) of a selective reflection band where selective reflection is exhibited depends on the birefringence $\Delta n$ of the liquid crystal compound and the above-described pitch P and satisfies the relation $\Delta\lambda = \Delta n \times P$. Therefore, the width of the selective reflection band can be controlled by adjusting $\Delta n$. $\Delta n$ can be adjusted by adjusting the type and mixing ratio of polymerizable liquid crystal compound or by controlling the temperature during the alignment and immobilization.

To form cholesteric liquid crystal layers of the same type having the same selective reflection center wavelength, a plurality of cholesteric liquid crystal layers having the same pitch P and the same helical sense may be stacked on top of each other. Laminating cholesteric liquid crystal layers having the same pitch P and the same helical sense can increase the circular polarization selectivity at a particular wavelength.

Retardation Layer

The inventors have discovered that providing a retardation layer between an image display device and a cholesteric liquid crystal layer enables image display with good light use efficiency. In particular, the inventors have discovered that a mirror with an image display function capable of displaying bright images is obtained when an image display device that displays images using linearly polarized light is used in combination. This is probably because the light emitted from the image display device can be transmitted to the front side without generating, in the circularly polarized light reflecting layer, circularly polarized light of a sense that causes a reflection to the image display side. Using a quarter-wave plate as a retardation layer enables a configuration that does not generate, in the cholesteric liquid crystal layer, circularly polarized light of a sense that causes a reflection to the image display device side, thus reducing the likelihood of a decrease in image display quality that might otherwise be caused by multiple reflection between the image display device and the half mirror.

The inventors have found that the change in shade, particularly, the change to yellow at the time when an image is obliquely observed is noticeable when a quarter-wave plate is used with a configuration in which a cholesteric liquid crystal layer that reflects blue light is disposed nearest to the front panel side. The inventors have further studied and discovered that using a retardation layer having a front phase difference as measured at a wavelength of 475 nm of 110 to 130 nm and a front phase difference as measured at a wavelength of 500 nm of 107 to 127 nm reduces such a change in shade. The front phase difference of the retardation layer as measured at a wavelength of 475 nm is preferably 115 to 120 nm, and the front phase difference as measured at a wavelength of 500 nm is more preferably 110 to 118 nm.

While not wishing to be bound by any theory, it is believed that the reason for the reduction in the change in shade is that the degree of circular polarization of the desired sense of blue light that has passed through the retardation layer after exiting the image display device is improved by adjusting the front phase difference of the retardation layer to a value nearer to the ¼ wavelength of blue light. In general, quarter-wave plates often have great phase differences as compared to the ¼ wavelength of blue light, and the degree of circular polarization of blue light that has passed through such a quarter-wave plate is not sufficiently high. In addition, it is believed that light in the selective reflection center wavelength range of the cholesteric liquid crystal layer disposed nearest to the front panel side obliquely passes through the other cholesteric liquid crystal layers, thus reducing the degree of circular polarization of the desired sense. This is because each cholesteric liquid crystal layer acts as a negative C-plate on light with a wavelength out of the selective reflection band. It is believed that the reduction of the degree of circular polarization of obliquely incident light forms a component of the opposite sense, and when the light of the opposite sense is reflected from the cholesteric liquid crystal layers toward the image display device, the transmitted light is tinged with the complementary color of the reflected light, thus causing a change in shade. It is believed that in the half mirror according to the present invention, the reflection described above is reduced by adjusting the front phase differences of the retardation layer at wavelengths of 475 nm and 500 nm to near the ¼ wavelength, thus reducing the occurrence of shades of yellow, which is the complementary color of blue light, on images.

As described above, when light is obliquely incident, the center wavelength of selective reflection shifts to the short wavelength side. However, in the half mirror according to the present invention, since the wavelength λ1 in the blue light wavelength range is strictly set to be in the range of 380 nm<λ1<500 nm, the selective reflection of the cholesteric liquid crystal layers at the time of oblique observation is in the UV wavelength range (i.e., out of the visible wavelength range), and the change in shade is less likely to occur. In other words, light obliquely passes through the other cholesteric liquid crystal layers to thereby reduce the degree of circular polarization in the blue light wavelength range, causing light of the opposite sense. Although this light is incident on the cholesteric liquid crystal layer having a selective reflection center wavelength at the wavelength λ1, the selective reflection of obliquely incident light is in the UV wavelength range, and thus blue light of the opposite sense is not reflected toward the image display device, causing no change in shade.

Furthermore, in the half mirror according to the present invention, the quotient of the sum of the products of reflectances (spectral reflectances) at wavelengths at 5-nm intervals from 475 to 500 nm and weighting coefficients divided by the sum of weighting coefficients of wavelengths at 5-nm intervals from 380 to 780 nm (hereinafter also referred to as "the weighted average reflectance in the range of 475 to 500 nm") is preferably small. The sum of weighting coefficients of wavelengths at 5-nm intervals from 380 to 780 nm is 100. Since light in the wavelength range of 475 to 500 nm is reflected from the cholesteric liquid crystal layers toward the image display device and, as a result, tends to cause a yellow shade in an image obliquely observed, light in this wavelength range is preferably reduced.

The weighted average reflectance in the range of 475 to 500 nm can be adjusted by controlling the selective reflection center wavelength, the thickness of the cholesteric liquid crystal layers, and the temperature for curing a liquid crystal composition during the formation of the cholesteric liquid crystal layers. The shape of the reflection peak in a reflection spectrum (the peak of transmittance decrease in a transmission spectrum) of the cholesteric liquid crystal layers becomes more rectangular as the thickness increases and becomes more flared as the thickness decreases. Thus, if the thickness is small, the weighted average reflectance in the range of 475 to 500 nm tends to be high compared to the reflectance. As the temperature for curing a liquid crystal compound increases, the apparent birefringence (Δn) decreases. Thus, as the curing temperature increases, the reflection band becomes narrower, and the weighted average reflectance in the range of 475 to 500 nm is more easily adjusted to be low.

Weighting coefficients are values for determining the value of Y, which is one of the tristimulus values X, Y, and Z for Standard Illuminant D65 described in JIS Z 8722 or JIS R 3106. The weighting coefficients for wavelengths of 475 nm to 500 nm are shown below.

TABLE 1

| Weighting coefficient for each wavelength | |
|---|---|
| Wavelength | Weighting coefficient |
| 475 | 0.615 |
| 480 | 0.763 |
| 485 | 0.900 |
| 490 | 1.071 |
| 495 | 1.335 |
| 500 | 1.671 |

Specifically, in the half mirror according to the present invention, a value of $(0.615X_{475}+0.763X_{480}+0.900X_{485}+1.071X_{490}+1.335X_{495}+1.671X_{500})/100$ is preferably 2.1% or less, where $X_{475}$, $X_{480}$, $X_{485}$, $X_{490}$, $X_{495}$, and $X_{500}$ are reflectances (spectral reflectances) at wavelengths of 475 nm, 480 nm, 485 nm, 490 nm, 495 nm, and 500 nm, respectively. This value is more preferably 1.5% or less, still more preferably 1.3% or less.

Any retardation layer may be appropriately selected according to the purpose. Examples include quartz plates, stretched polycarbonate films, stretched norbornene polymer films, aligned transparent films containing birefringent inorganic particles such as strontium carbonate, and thin films obtained by oblique vapor deposition of inorganic dielectrics on supports.

In particular, the retardation layer is preferably formed by aligning and immobilizing a polymerizable liquid crystal compound. For example, the retardation layer can be formed by applying a liquid crystal composition containing a polymerizable liquid crystal compound to a surface of a temporary support, an alignment layer, or a front panel and nematically aligning the polymerizable liquid crystal compound in the liquid crystalline state, followed by immobilization by photocrosslinking or thermal crosslinking.

Details of the liquid crystal composition and the production method will be described later. The retardation layer may be a layer obtained by applying a liquid crystal composition containing a high-molecular liquid crystal compound to a surface of a temporary support, an alignment layer, or a front panel and nematically aligning the high-molecular liquid crystal compound in the liquid crystalline state, followed by immobilization by cooling.

The retardation layer and the circularly polarized light reflecting layer may be bonded to each other with an adhesive layer or may be in direct contact with each other. The latter is preferred.

Methods for Producing Cholesteric Liquid Crystal Layers and Retardation Layer Formed of Liquid Crystal Composition Materials and production methods for cholesteric liquid crystal layers and a retardation layer formed of a liquid crystal composition will now be described.

Examples of materials used to form the retardation layer include liquid crystal compositions containing polymerizable liquid crystal compounds.

Examples of materials used to form the cholesteric liquid crystal layers include liquid crystal compositions containing polymerizable liquid crystal compounds and chiral agents (optically active compounds). These liquid crystal compositions may optionally further contain, for example, a surfactant, a polymerization initiator, or a solvent. The cholesteric liquid crystal layers or the retardation layer can be formed, for example, by applying a liquid crystal composition containing a solvent to a temporary support, a support, an alignment layer, a cholesteric liquid crystal layer to serve as an underlayer, or the like and performing maturing of alignment, followed by immobilization by curing of the liquid crystal composition.

Polymerizable Liquid Crystal Compound

The polymerizable liquid crystal compound may be a rod-like liquid crystal compound.

Examples of rod-like polymerizable liquid crystal compounds include rod-like nematic liquid crystal compounds. Examples of rod-like nematic liquid crystal compounds that are suitable for use include azomethines, azoxies, cyanobiphenyls, cyanophenyl esters, benzoic acid esters, cyclohexanecarboxylic acid phenyl esters, cyanophenyl cyclohexanes, cyano-substituted phenylpyrimidines, alkoxy-substituted phenylpyrimidines, phenyldioxanes, tolans, and alkenyl cyclohexyl benzonitriles. High-molecular liquid crystal compounds as well as low-molecular liquid crystal compounds can be used.

The polymerizable liquid crystal compound is obtained by introducing a polymerizable group into a liquid crystal compound. Examples of polymerizable groups include unsaturated polymerizable groups, an epoxy group, and an aziridinyl group. Unsaturated polymerizable groups are preferred, and ethylenically unsaturated polymerizable groups are particularly preferred. The polymerizable group can be introduced into the molecules of a liquid crystal compound by various methods. The number of polymerizable groups in the polymerizable liquid crystal compound is preferably 1 to 6, more preferably 1 to 3. Examples of polymerizable liquid crystal compounds include compounds described, for example, in Makromol. Chem., vol. 190, p. 2255 (1989), Advanced Materials, vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. The combined use of two or more polymerizable liquid crystal compounds enables alignment at lower temperatures.

The amount of polymerizable liquid crystal compound added to the liquid crystal composition is preferably 80% to 99.9% by mass, more preferably 85% to 99.5% by mass, particularly preferably 90% to 99% by mass, based on the mass of solids (the mass excluding the mass of solvent) in the liquid crystal composition.

Chiral Agent: Optically Active Compound

The material used to form the cholesteric liquid crystal layers preferably contains a chiral agent. The chiral agent has a function to induce a helical structure of the cholesteric liquid crystalline phase. The chiral compound may be selected according to the purpose because the helical sense or helical pitch to be induced varies depending on the compound.

Any chiral agent may be used. Examples include known compounds (e.g., those described in Liquid Crystal Device Handbook, chapter 3, paragraph 4-3, Chiral Agent for TN and STN, page 199, edited by 142nd Committee of Japan Society for the Promotion of Science, 1989), isosorbide derivatives, and isomannide derivatives.

Although chiral agents generally contain asymmetric carbon atoms, axial asymmetric compounds and planar asymmetric compounds, which contain no asymmetric carbon atoms, can also be used as chiral agents. Examples of axial asymmetric compounds and planar asymmetric compounds include binaphthyls, helicenes, paracyclophanes, and derivatives thereof. The chiral agent may have a polymerizable group. When the chiral agent has a polymerizable group, a polymer having a repeating unit derived from the polymerizable liquid crystal compound and a repeating unit derived from the chiral agent can be formed by the polymerization reaction between the polymerizable chiral agent and the polymerizable liquid crystal compound. In this case, the polymerizable group of the polymerizable chiral agent is preferably the same group as the polymerizable group of the polymerizable liquid crystal compound. Therefore, the polymerizable group of the chiral agent is also preferably an unsaturated polymerizable group, an epoxy group, or an aziridinyl group, more preferably an unsaturated polymerizable group, particularly preferably an ethylenically unsaturated polymerizable group.

The chiral agent may be a liquid crystal compound.

The content of the chiral agent in the liquid crystal composition is preferably 0.01 mol % to 200 mol %, more preferably 1 mol % to 30 mol %, based on the amount of polymerizable liquid crystal compound.

Polymerization Initiator

The liquid crystal composition preferably contains a polymerization initiator. In the case where polymerization reaction is driven by ultraviolet irradiation, the polymerization initiator for use is preferably a photopolymerization initiator capable of initiating polymerization reaction in response to ultraviolet irradiation. Examples of photopolymerization initiators include a-carbonyl compounds (described in U.S. Pat. Nos. 2,367,661A and 2,367,670A), acyloin ethers (described in U.S. Pat. No. 2,448,828A), a-hydrocarbon-substituted aromatic acyloin compounds (described in U.S. Pat. No. 2,722,512A), polynuclear quinone compounds (described in U.S. Pat. No. 3,046,127A and U.S. Pat. No. 2,951,758A), combinations of triarylimidazole dimers and p-aminophenyl ketone (described in U.S. Pat. No. 3,549,367A), acridine and phenazine compounds (described in JP1985-105667A (JP-S60-105667A) and U.S.

Pat. No. 4,239,850A), and oxadiazole compounds (described in U.S. Pat. No. 4,212,970A).

The content of the photopolymerization initiator in the liquid crystal composition is preferably 0.1% to 20% by mass, more preferably 0.5% to 5% by mass, based on the total mass of the polymerizable liquid crystal compound.

Cross-Linking Agent

The liquid crystal composition may optionally contain a cross-linking agent in order to provide improved film strength and improved durability after curing. Cross-linking agents that are curable by ultraviolet light, heat, moisture, and the like are suitable for use.

Any cross-linking agent may be appropriately selected according to the purpose. Examples include polyfunctional acrylate compounds such as trimethylolpropane tri(meth) acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris [3 -(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having oxazoline side groups; and alkoxysilane compounds such as vinyltrimethoxysilane and N-(2-aminoethyl)3-aminopropyltrimethoxysilane. In addition, a known catalyst can be used according to the reactivity of the cross-linking agent. The use of a known catalyst can improve the productivity in addition to the film strength and the durability. These cross-linking agents may be used alone or in combination.

The amount of cross-linking agent is preferably 3% to 20% by mass, more preferably 5% to 15% by mass, based on the total mass of the polymerizable liquid crystal compound. A cross-linking agent in an amount of 3% by mass or more can produce the effect of improving the crosslink density. A cross-linking agent in an amount of 20% by mass or less can maintain the stability of layers formed.

Alignment Controlling Agent

An alignment controlling agent that contributes to stably or rapidly achieving planar alignment may be added to the liquid crystal composition. Examples of alignment controlling agents include fluorine (meth)acrylate polymers described in paragraphs [0018] to [0043] of JP2007-272185A and compounds represented by formulae (I) to (IV) described in paragraphs [0031] to [0034] of JP2012-203237A.

These alignment controlling agents may be used alone or in combination.

The amount of alignment controlling agent added to the liquid crystal composition is preferably 0.01% to 10% by mass, more preferably 0.01% to 5% by mass, particularly preferably 0.02% to 1% by mass, based on the total mass of the polymerizable liquid crystal compound.

Other Additives

The liquid crystal composition may contain at least one selected from the group consisting of various additives such as surfactants for adjusting the surface tension of a coating to make the coating thickness uniform and polymerizable monomers. Optionally, the liquid crystal composition may further contain a polymerization inhibitor, an antioxidant, an ultraviolet absorber, a light stabilizer, a coloring material, fine metal oxide particles, and the like to the extent that the optical performance is not degraded.

Solvent

For the preparation of the liquid crystal composition, any solvent appropriately selected according to the purpose may be used. Organic solvents are suitable for use.

Any organic solvent may be appropriately selected according to the purpose. Examples include ketones, alkyl halides, amides, sulfoxides, heterocyclic compounds, hydrocarbons, esters, and ethers. These may be used alone or in combination. Of these, ketones are particularly preferred in view of environmental loads.

Application, Alignment, and Polymerization

For the application of the liquid crystal composition to a temporary support, an alignment layer, a retardation layer, a cholesteric liquid crystal layer to serve as an underlayer, or the like, any method may be appropriately selected according to the purpose. Examples include wire bar coating, curtain coating, extrusion coating, direct gravure coating, reverse gravure coating, die coating, spin coating, dip coating, spray coating, and slide coating. Alternatively, the liquid crystal composition applied onto another support may be transferred. By heating the liquid crystal composition applied, liquid crystal molecules are aligned. To form a cholesteric liquid crystal layer, cholesteric alignment is performed, whereas to form a retardation layer, nematic alignment is preferably performed. The heating temperature for cholesteric alignment is preferably 200° C. or lower, more preferably 130° C. or lower. This alignment treatment provides an optical thin film in which a polymerizable liquid crystal compound is twistedly aligned so as to have a helical axis substantially perpendicular to the film plane. The heating temperature for nematic alignment is preferably 50° C. to 120° C., more preferably 60° C. to 100° C.

The aligned liquid crystal compound can be further polymerized to be cured. The polymerization may be thermal polymerization or photopolymerization by light irradiation and is preferably photopolymerization. For the light irradiation, ultraviolet rays are preferably used. The irradiation energy is preferably 20 mJ/cm$^2$ to 50 J/cm$^2$, more preferably 100 mJ/cm$^2$ to 1,500 mJ/cm$^2$. To promote the photopolymerization, the light irradiation may be performed under heating conditions or in a nitrogen atmosphere. The wavelength of ultraviolet radiation is preferably 350 nm to 430 nm. From the viewpoint of stability, the rate of polymerization reaction is preferably high. Specifically, the rate of polymerization reaction is preferably 70% or more, more preferably 80% or more. The rate of polymerization reaction can be determined by measuring the consumption rate of polymerizable functional groups by using an IR absorption spectrum.

Each cholesteric liquid crystal layer may have any thickness as long as the properties described above are exhibited, but the thickness is preferably in the range of 1.0 μm or more and 150 μm or less, more preferably in the range 4.0 μm or more and 100 μm or less. The retardation layer may have any thickness, but the thickness is preferably 0.2 to 10 μm, more preferably 0.5 to 2 μm.

Temporary Support, Support, and Alignment Layer

The liquid crystal composition may be formed as a layer by being applied to a temporary support or to the surface of an alignment layer formed on a surface of the temporary support. The temporary support or the temporary support with the alignment layer may be peeled off after a circularly polarized light reflecting layer or a retardation layer is formed.

A support may be used particularly when a retardation layer is formed. The support need not be peeled off after the retardation layer is formed. Examples of materials for the temporary support and the support include polyesters such as polyethylene terephthalate (PET), polycarbonates, acrylic resins, epoxy resins, polyurethanes, polyamides, polyolefins, cellulose derivatives, silicones, and glass plates. For example, the temporary support may be made of any material as long as it can be peeled off after a circularly polarized light reflecting layer is bonded to a front panel. The temporary support may function as a protective film until the circularly polarized light reflecting layer, after being bonded to the front panel, is bonded to an image display device.

The alignment layer can be provided by means of, for example, rubbing treatment of an organic compound such as a polymer (a resin such as polyimide, polyvinyl alcohol, polyester, polyarylate, polyamide-imide, polyetherimide, polyamide, or modified polyamide), oblique vapor deposition of an inorganic compound, formation of a layer having microgrooves, or accumulation of an organic compound (e.g., ω-tricosanoic acid, dioctadecylmethylammonium chloride, or methyl stearate) by the Langmuir-Blodgett method (LB film). Furthermore, an alignment layer whose alignment function is activated by the application of an electric field, the application of a magnetic field, or light irradiation may be used.

In particular, an alignment layer made of a polymer is preferably subjected to rubbing treatment, and the liquid crystal composition is preferably applied to the rubbing-treated surface. The rubbing treatment can be performed by rubbing a surface of the alignment layer with a sheet of paper or a cloth in a certain direction several times.

The liquid crystal composition may be applied to a surface of the temporary support or the rubbing-treated surface of the temporary support without providing an alignment layer.

The thickness of the alignment layer is preferably 0.01 to 5 μm, more preferably 0.05 to 2 μm.

Layered Film Formed of Polymerizable Liquid Crystal Compound

A layered film formed of a plurality of cholesteric liquid crystal layers and a layered film formed of a retardation layer and the plurality of cholesteric liquid crystal layers each can be formed by repeating the step of applying a liquid crystal composition containing a polymerizable liquid crystal compound and other components directly to a surface of the retardation layer or the previous cholesteric liquid crystal layer, the alignment step, and the immobilization step. Alternatively, a retardation layer separately provided and cholesteric liquid crystal layers or a layered body thereof may be laminated to each other using, for example, an adhesive, but the former is preferred. The reason is that if an adhesive layer that is typically provided so as to have a thickness of 0.5 to 10 μm is used, interference fringes due to the unevenness in thickness of the adhesive layer may be observed, and thus the stacking without using an adhesive layer is preferred. By performing the stacking of cholesteric liquid crystal layers such that the next cholesteric liquid crystal layer is formed so as to be in direct contact with a surface of the previously formed cholesteric liquid crystal layer, the alignment azimuth of liquid crystal molecules on the air interface side of the previously formed cholesteric liquid crystal layer agrees with the alignment azimuth of liquid crystal molecules on the lower side of the cholesteric liquid crystal layer formed thereon, and the layered body of cholesteric liquid crystal layers has good polarization properties. Alternatively, cholesteric liquid crystal layers in each of which helical pitches are continuously changed may be used to form a layered film.

Front Panel

The mirror with an image display function according to the present invention has a front panel. The front panel may be in direct contact with the circularly polarized light reflecting layer or bonded to the circularly polarized light reflecting layer, for example, through an adhesive layer.

Any front panel may be used. Examples of front panels that may be used include glass plates and plastic films used for standard mirrors. The front panel is preferably transparent in the visible range. Being transparent in the visible range means that the light transmittance in the visible range is 80% or more, preferably 85% or more. The light transmittance used as a measure of transparency can be calculated by measuring the total light transmittance and the amount of scattered light by using the method described in JIS-K7105, that is, an integrating-sphere light transmittance meter and subtracting a diffuse transmittance from the total light transmittance.

The front panel preferably has low birefringence. For example, the front phase difference may be 20 nm or less, preferably less than 10 nm, more preferably 5 nm or less. Examples of materials for plastic films include polycarbonates, acrylic resins, epoxy resins, polyurethanes, polyamides, polyolefins, cellulose derivatives, and silicones.

The front panel may have a thickness of about 100 μm to 10 mm. The thickness is preferably 200 μm to 5 mm, more preferably 500 μm to 2 mm, still more preferably 500 μm to 1,000 μm.

Adhesive Layer

The mirror with an image display function according to the present invention may include adhesive layers for adhesion between the image display device and the circularly polarized light reflecting layer, between the circularly polarized light reflecting layer and the front panel, and between other layers. The adhesive layers may be any layers formed of adhesives.

According to the type of setting, adhesives are classified into hot melt adhesives, thermosetting adhesives, photosetting adhesives, reaction-setting adhesives, and pressure-sensitive adhesives requiring no setting. Examples of usable materials for these adhesives include compounds such as acrylate compounds, urethane compounds, urethane acrylate compounds, epoxy compounds, epoxy acrylate compounds, polyolefin compounds, modified olefin compounds, polypropylene compounds, ethylene vinyl alcohol compounds, vinyl chloride compounds, chloroprene rubber compounds, cyanoacrylate compounds, polyamide compounds, polyimide compounds, polystyrene compounds, and polyvinyl butyral compounds. From the viewpoint of workability and productivity, the type of setting is preferably photosetting, and from the viewpoint of optical transparency and heat resistance, the material for use is preferably, for example, an acrylate compound, a urethane acrylate compound, or an epoxy acrylate compound.

Method for Fabricating Half Mirror

The half mirror may be fabricated by forming a circularly polarized light reflecting layer on a front panel or forming a circularly polarized light reflecting layer and a retardation layer in this order from the front panel side. Alternatively, the half mirror may be fabricated by transferring to a front panel a circularly polarized light reflecting layer formed on a temporary support or a retardation layer and a circularly polarized light reflecting layer formed on a temporary support. For example, a layered body of cholesteric liquid crystal layers is formed on a temporary support to form a circularly polarized light reflecting layer. The surface of the circularly polarized light reflecting layer is then bonded to a front panel, and the temporary support is peeled off. Subsequently, a retardation layer is provided to obtain a half mirror. Alternatively, after a retardation layer is formed on a temporary support, cholesteric liquid crystal layers are sequentially formed on the retardation layer to form a layered body of the retardation layer and the circularly polarized light reflecting layer, and the surface of the circularly polarized light reflecting layer is bonded to a front panel, after which the temporary support is peeled off as needed to obtain a half mirror.

Mirror with Image Display Function

The mirror with an image display function according to the present invention includes the half mirror described above and an image display device. The mirror with an image display function according to the present invention includes an image display device, a retardation layer, a circularly polarized light reflecting layer, and a front panel that are disposed in this order. The mirror with an image display function according to the present invention may include another layer such as an adhesive layer. In the mirror with an image display function, the image display device and the half mirror may be in direct contact with each other, may be interposed by an air layer, or may be bonded together with an adhesive layer interposed therebetween.

The area of the major surface of the retardation layer may be smaller than, equal to, or larger than the area of an image display unit.

In the mirror with an image display function according to the present invention, the slow axis of the retardation layer is preferably adjusted so that images are most brightly displayed. Specifically, with respect particularly to an image display device that displays images using linearly polarized light, the relation between the polarization direction (transmission axis) of the linearly polarized light and the slow axis of the retardation layer are preferably adjusted so that the linearly polarized light can be best transmitted. For example, in the retardation layer, the transmission axis and the slow axis preferably form an angle of 45°. Light emitted from the image display device that displays images using linearly polarized light becomes circularly polarized light of either a right-handed or left-handed sense after passing through the retardation layer. The circularly polarized light reflecting layer described later may be constituted by cholesteric liquid crystal layers having a twisted direction that allows circularly polarized light of the above sense to pass.

Interposing the retardation layer between the image display device and the circularly polarized light reflecting layer allows light from the image display device to convert into circularly polarized light before entering the circularly polarized light reflecting layer. As a result, the amount of light that is reflected by the circularly polarized light reflecting layer and returns to the image display device side can be significantly reduced, thus enabling the display of bright images.

Image Display Device

Any image display device may be used. The image display device is preferably an image display device that emits (gives off) linearly polarized light to form images. More preferably, the image display device is a liquid crystal display device.

The liquid crystal display device may be of a transmissive type or a reflective type and is particularly preferably of a transmissive type. The liquid crystal display device may be any liquid crystal display device such as an in-plane switching (IPS) mode device, a fringe field switching (FFS) mode device, a vertical alignment (VA) mode device, an electrically controlled birefringence (ECB) mode device, a super twisted nematic (STN) mode device, a twisted nematic (TN) mode device, or an optically compensated bend (OCB) mode device.

Images displayed on the image display unit of the image display device may be still images, moving images, or simple textual information. The images may be displayed as mono-color images, such as black and white, multi-color images, or full-color images. Preferred examples of such images displayed on the image display unit of the image display device include images picked up by onboard cameras. These images are preferably moving images.

The image display device, for example, may show a red light emission peak wavelength $\lambda R$, a green light emission peak wavelength $\lambda G$, and a blue light emission peak wavelength $\lambda B$ in an emission spectrum at the time of white display. Having such emission peak wavelengths enables a full-color image display. $\lambda R$ may be any wavelength in the range of 580 to 700 nm, preferably in the range of 610 to 680 nm. $\lambda G$ may be any wavelength in the range of 500 to 580, preferably in the range of 510 to 550 nm. $\lambda B$ may be any wavelength in the range of 400 to 500 nm, preferably in the range of 440 to 480 nm.

Method for Fabricating Mirror with Image Display Function

The mirror with an image display function according to the present invention can be fabricated by disposing the half mirror described above on the image display side of an image display device and integrating the image display device with the half mirror. The half mirror is disposed such that the image display device, the retardation layer, the circularly polarized light reflecting layer, and the front panel are disposed in this order. The integration of the image display device with the half mirror may be performed by interconnection with a frame or hinge or by bonding. For example, the mirror with an image display function according to the present invention can be fabricated by bonding the half mirror including the front panel, the circularly polarized light reflecting layer, and the retardation layer to the image display surface of the image display device with the retardation layer facing the image display device.

Applications of Mirror with Image Display Function

The mirror with an image display function according to the present invention may be used in any applications. For example, the mirror can be used as a security mirror, a mirror in a beauty parlor or barbershop, or the like to display images such as textual information, still images, and moving images. The mirror with an image display function according to the present invention may be a vehicle rear-view mirror or may be used for television sets, personal computers, smartphones, and cellular phones.

Particularly preferably, the mirror with an image display function according to the present invention is used as a vehicle rear-view mirror. For use as a rear-view mirror, the mirror with an image display function may have a support arm or the like for attachment to a frame, a housing, or a vehicle body. Alternatively, the vehicle mirror with an image display function may be formed for incorporation into a rear-view mirror. The vehicle mirror with an image display function having such a shape is generally able to determine the upward, downward, right, and left directions during use.

If the mirror with an image display function is curved such that the convex surface is on the front side, the mirror can be used as a wide-angle mirror that allows rearward views and the like to be visible at wide angles. Such a curved front can be fabricated using a curved half mirror.

The curve may be in the vertical direction, the horizontal direction, or the vertical and horizontal directions. The radius of curvature of the curve is preferably 500 to 3,000 mm, more preferably 1,000 to 2,500 mm. The radius of curvature is a radius of an imaginary circumcircle of the curved portion in section.

EXAMPLES

The present invention will now be described in more detail with reference to examples. Materials, reagents, amounts and percentages of substances, operations, etc. used in the following examples can be changed as appropriate without departing from the spirit of the present invention. Therefore, it should be noted that the following examples are not intended to limit the scope of the present invention.

Production of Cholesteric Liquid Crystal Layer and Retardation Layer (Cholesteric Liquid Crystal Film)

(1) According to the compositions shown in Table 2 below, Coating solution 1 for a retardation layer and Coating solutions 2 to 6 for forming cholesteric liquid crystal layers were prepared.

TABLE 2

| Type | Material (manufacturer) | Coating solution 1 (retardation layer) | Coating solution 2 (630 nm) | Coating solution 3 (540 nm) | Coating solution 4 (450 nm) | Coating solution 5 (460 nm) | Coating solution 6 (470 nm) |
|---|---|---|---|---|---|---|---|
| Rod-like liquid crystal compound | Compound 1 shown below | 100 parts by mass | 100 parts by mass | 100 parts by mass | 100 parts by mass | 100 parts by mass | 100 parts by mass |
| Chiral agent for right twist | Paliocolor LC756 (BASF) | none | 4.7 parts by mass | 5.5 parts by mass | 6.7 parts by mass | 6.5 parts by mass | 6.3 parts by mass |
| Polymerization initiator | Irgacure819 (BASF) | 4 parts by mass | 4 parts by mass | 4 parts by mass | 4 parts by mass | 4 parts by mass | 4 parts by mass |
| Alignment controlling agent | Compound 2 shown below | 0.1 parts by mass | 0.1 parts by mass | 0.1 parts by mass | 0.1 parts by mass | 0.1 parts by mass | 0.1 parts by mass |
| Cross-linking agent | A-TMMT (Shin-Nakamura Chemical Co., Ltd.) | 1.0 part by mass | 1.0 part by mass | 1.0 part by mass | 1.0 part by mass | 1.0 part by mass | 1.0 part by mass |
| Solvent | 2-Butanone (Wako Pure Chemical Industries, Ltd.) | 170 parts by mass | 170 parts by mass | 170 parts by mass | 170 parts by mass | 170 parts by mass | 170 parts by mass |

Rod-like liquid crystal compound: Compound 1

Alignment controlling agent: Compound 2

| $R^1$ | $R^2$ | X |
|---|---|---|
| $O(CH_2)_2O(CH_2)_2(CF_2)_6F$ | $O(CH_2)_2O(CH_2)_2(CF_2)_5F$ | NH |

Compound 2 was produced by the method described in JP2005-99248A.

PET films (Cosmoshine A4100; thickness, 100 μm) available from Toyobo Co., Ltd. were used as temporary supports (280 mm×85 mm), and the temporary supports were subjected to rubbing treatment (rayon cloth; pressure, 0.1 kgf (0.98 N); the number of revolutions, 1,000 rpm; transport speed, 10 m/min; the number of reciprocating cycles, 1). Using a wire bar, Coating solutions 2 to 6 were applied to the rubbing-treated surfaces of the temporary supports. The coated temporary supports were then dried and placed on a hot plate at 30° C. or on a hot plate at 70° C. The temporary supports on the hot plates were irradiated with UV for 6 seconds using a D-bulb electrodeless lamp (60 mW/cm$^2$) available from Fusion UV Systems, Inc., and the cholesteric liquid crystalline phases were immobilized to obtain cholesteric liquid crystal layers having thicknesses of 2.4 to 3.5 μm. The selective reflection center wavelength and reflectance at a specular reflection angle of 5° and the reflectances at wavelengths of 475 nm, 480 nm, 485 nm, 490 nm, 495 nm, and 500 nm ($X_{475}$, $X_{480}$, $X_{485}$, $X_{490}$, $X_{495}$, and $X_{500}$) of the cholesteric liquid crystal layers obtained were measured using a V-670 spectrophotometer available from JASCO Corporation. The values obtained were each multiplied by the weighting coefficient for each wavelength, and the sum of the products ($0.615X_{475}+0.763X_{480}+0.900X_{485}+1.071X_{490}+1.335X_{495}+1.671X_{500}$) was calculated and divided by 100 (the sum of the weighting coefficients for 380 to 780 nm). The results are shown in Table 3.

plate at 30° C. The temporary support on the hot plate was irradiated with UV for 6 seconds using a D-bulb electrodeless lamp (60 mW/cm$^2$) available from Fusion UV Systems, Inc., and the cholesteric liquid crystalline phase was immobilized to obtain a retardation layer having a thickness of 0.65 μm. A portion of the retardation layer was cut out and laminated to an acrylic sheet (thickness: 0.3 mm) using an adhesive sheet (PDS-1) available from Panac Corporation. Thereafter, the temporary support was peeled off, and using an AxoScan available from Axometrix, Re was measured at wavelengths of 475 nm and 500 nm to be 119 nm and 115 nm, respectively.

Liquid crystal layer 1, Liquid crystal layer 2, and Liquid crystal layer 3 described above were stacked in this order on the surface of the retardation layer to obtain Laminate A of the retardation layer and the three cholesteric liquid crystal layers. The reflection spectrum of Laminate A was measured with a spectrophotometer (V-670 available from JASCO Corporation) at a specular reflection angle of 5° to obtain reflection spectra having selective reflection (reflectance: 47%) center wavelengths at 630 nm, 540 nm, and 450 nm.

(3) After an LCR0631 adhesive available from Toagosei Co., Ltd. was applied with a wire bar to the cholesteric liquid crystal layer surface of Laminate A, Laminate A was laminated to a surface of a glass laminate by using a laminator. At this time, the diameter of the wire bar and the nip roll pressure of the laminator were adjusted to adjust the thickness of the adhesive layer to be 2 μm. Thereafter, Laminate A was placed on a hot plate at 50° C. Laminate A on the hot

TABLE 3

|  | Liquid crystal layer 1 | Liquid crystal layer 2 | Liquid crystal layer 3 | Liquid crystal layer 4 | Liquid crystal layer 5 | Liquid crystal layer 6 | Liquid crystal layer 7 |
| --- | --- | --- | --- | --- | --- | --- | --- |
| Coating solution used | Coating solution 2 | Coating solution 3 | Coating solution 4 | Coating solution 5 | Coating solution 6 | Coating solution 6 | Coating solution 6 |
| UV curing temperature | 30° C. | 30° C. | 30° C. | 30° C. | 30° C. | 30° C. | 70° C. |
| Thickness | 3.5 μm | 3.0 μm | 2.4 μm | 2.4 μm | 2.4 μm | 2.7 μm | 2.7 μm |
| Reflection center wavelength | 630 nm | 540 nm | 450 nm | 460 nm | 470 nm | 470 nm | 470 nm |
| Reflectance at center wavelength | 47% | 47% | 42% | 42% | 42% | 42% | 47% |
| Weighted average reflectance in the range of 475 to 500 nm | 0.71% | 0.86% | 1.1% | 1.3% | 2.1% | 1.8% | 1.5% |

The comparison of Liquid crystal layers 5 to 7 in Table 3 shows that even if the liquid crystal layers are produced using the same coating solution and have the same reflection center wavelength, the weighted average reflectance increases as the thickness decreases, and the weighted average reflectance decreases as the curing temperature during the formation of the liquid crystal layers increases.

Example 1

(1) A PET film (Cosmoshine A4100; thickness, 100 μm) available from Toyobo Co., Ltd. was used as a temporary support (280 mm×85 mm), and the temporary support was subjected to rubbing treatment (rayon cloth; pressure, 0.1 kgf (0.98 N); the number of revolutions, 1,000 rpm; transport speed, 10 m/min; the number of reciprocating cycles, 1).

(2) Using a wire bar, Coating solution 1 was applied to the rubbing-treated surface of the temporary support. The coated temporary support was then dried and placed on a hot plate was irradiated with UV for 30 seconds using a D-bulb electrodeless lamp (60 mW/cm$^2$) available from Fusion UV Systems, Inc., to make Laminate A adhere to the glass laminate. Thereafter, the PET film was peeled off Laminate A to obtain Half mirror A.

Example 2

The same procedure as in Example 1 was conducted to form a retardation layer except that the thickness of the retardation layer was changed to 0.82 μm. A portion of the retardation layer was cut out and laminated to an acrylic sheet using a PDS-1 adhesive sheet. Thereafter, the temporary support was peeled off, and using an AxoScan available from Axometrix, Re was measured at wavelengths of 475 nm and 500 nm to be 130 nm and 127 nm, respectively. Next, Half mirror B was obtained in the same manner as in Example 1.

Example 3

The same procedure as in Example 1 was conducted to form a retardation layer except that the thickness of the retardation layer was changed to 0.60 μm. A portion of the retardation layer was cut out and laminated to an acrylic sheet using a PDS-1 adhesive sheet. Thereafter, the temporary support was peeled off, and using an AxoScan available from Axometrix, Re was measured at wavelengths of 475 nm and 500 nm to be 110 nm and 107 nm, respectively. Next, Half mirror C was obtained in the same manner as in Example 1.

Example 4

Half mirror D was obtained in the same manner as in Example 1 except that cholesteric liquid crystal layers were formed by stacking Liquid crystal layer 2, Liquid crystal layer 1, and Liquid crystal layer 3 in this order.

Example 5

Half mirror E was obtained in the same manner as in Example 1 except that Liquid crystal layer 3 was replaced with Liquid crystal layer 4.

Example 6

Half mirror F was obtained in the same manner as in Example 1 except that Liquid crystal layer 3 was replaced with Liquid crystal layer 7.

Example 7

Half mirror G was obtained in the same manner as in Example 1 except that Liquid crystal layer 3 was replaced with Liquid crystal layer 5.

Comparative Example 1

The same procedure as in Example 1 was conducted to form a retardation layer except that the thickness of the retardation layer was changed to 0.85 μm. A portion of the retardation layer was cut out and laminated to an acrylic sheet using a PDS-1 adhesive sheet. Thereafter, the temporary support was peeled off, and using an AxoScan available from Axometrix, Re was measured at wavelengths of 475 nm and 500 nm to be 145 nm and 143 nm, respectively. Next, Half mirror H was obtained in the same manner as in Example 1.

Comparative Example 2

The same procedure as in Example 1 was conducted to form a retardation layer except that the thickness of the retardation layer was changed to 0.55 μm. A portion of the retardation layer was cut out and laminated to an acrylic sheet using a PDS-1 adhesive sheet. Thereafter, the temporary support was peeled off, and using an AxoScan available from Axometrix, Re was measured at wavelengths of 475 nm and 500 nm to be 100 nm and 97 nm, respectively. Next, Half mirror I was obtained in the same manner as in Example 1.

Comparative Example 3

Half mirror J was obtained in the same manner as in Example 1 except that the order in which cholesteric liquid crystal layers were stacked was changed to Liquid crystal layer 1, Liquid crystal layer 3, and Liquid crystal layer 2.

Comparative Example 4

Half mirror K was obtained in the same manner as in Example 1 except that the order in which cholesteric liquid crystal layers were stacked was changed to Liquid crystal layer 3, Liquid crystal layer 2, and Liquid crystal layer 1.

Weighted Average Reflectance

The reflectances at wavelengths of 475 nm, 480 nm, 485 nm, 490 nm, 495 nm, and 500 nm ($X_{475}$, $X_{480}$, $X_{485}$, $X_{490}$, $X_{495}$, and $X_{500}$) of each of the half mirrors obtained were measured using a V-670 spectrophotometer available from JASCO Corporation. The values obtained were each multiplied by the weighting coefficient for each wavelength, and the sum of the products ($0.615X_{475}+0.763X_{480}+0.900X_{485}+1.071X_{490}+1.335X_{495}+1.671X_{500}$) was calculated and divided by the sum of the weighting coefficients for 380 to 780 nm. The results are shown in Table 4.

Mirror with Image Display Function

The half mirrors produced above were each bonded to the image display unit surface of an image display device (iPad (registered trademark) Retina) such that the glass plate, the circularly polarized light reflecting layer, the retardation layer, and the image display device were disposed in this order to fabricate mirrors with an image display function. At this time, the half mirrors were each disposed such that the slow axis of the retardation layer was at an angle of 45° to the transmission axis of the image display device (the polarization direction of the light emitted from the image display device).

Method of Measuring Shade of Image

The optical system (luminance meter: BM-5A available from Topcon Corporation) shown in Figure was assembled in a darkroom. The iPad was turned on, and a white image was displayed. The tristimulus values X, Y, and Z at the time when the image was viewed from the normal direction (front) and the tristimulus values X, Y, and Z at the time when the image was viewed at an oblique angle of 45° were measured with luminance meters. The measured values were mapped on an xy chromaticity diagram. The smaller the distance (chromaticity difference) between the point of the value measured from the front and the point of the value measured at an oblique angle of 45°, the smaller the change in shade. The results are shown in Table 4. As shown in Table 4, the distance (chromaticity difference) is small in Examples 1 to 7, particularly, Examples 1 to 6.

TABLE 4

| | Re of retardation layer | | Center wavelengths of liquid crystal layers (the order of stacking is a, b, and c from the glass plate side) Reflectances at center wavelength are in parentheses. | | | Weighted average of reflectances multiplied by weighting coefficients (%) | Chromaticity difference |
|---|---|---|---|---|---|---|---|
| | at 475 nm | at 500 nm | a | b | c | | |
| Example 1 (Half mirror A) | 119 nm | 115 nm | 450 nm (42%) | 540 nm (47%) | 630 nm (47%) | 1.1% | 0.013 |
| Example 2 (Half mirror B) | 130 nm | 127 nm | 450 nm (42%) | 540 nm (47%) | 630 nm (47%) | 1.1% | 0.029 |
| Example 3 (Half mirror C) | 110 nm | 107 nm | 450 nm (42%) | 540 nm (47%) | 630 nm (47%) | 1.1% | 0.027 |
| Example 4 (Half mirror D) | 119 nm | 115 nm | 450 nm (42%) | 630 nm (47%) | 540 nm (47%) | 1.1% | 0.017 |
| Example 5 (Half mirror E) | 119 nm | 115 nm | 460 nm (42%) | 540 nm (47%) | 630 nm (47%) | 1.3% | 0.031 |
| Example 6 (Half mirror F) | 119 nm | 115 nm | 470 nm (47%) | 540 nm (47%) | 630 nm (47%) | 1.5% | 0.045 |
| Example 7 (Half mirror G) | 119 nm | 115 nm | 470 nm (42%) | 540 nm (47%) | 630 nm (47%) | 2.1% | 0.065 |
| Comparative example 1 (Half mirror H) | 145 nm | 143 nm | 450 nm (42%) | 540 nm (47%) | 630 nm (47%) | 1.1% | 0.072 |
| Comparative example 2 (Half mirror I) | 100 nm | 97 nm | 450 nm (42%) | 540 nm (47%) | 630 nm (47%) | 1.1% | 0.075 |
| Comparative example 3 (Half mirror J) | 119 nm | 115 nm | 540 nm (47%) | 450 nm (42%) | 630 nm (47%) | 1.1% | 0.071 |
| Comparative example 4 (Half mirror K) | 119 nm | 115 nm | 630 nm (47%) | 540 nm (47%) | 450 nm (42%) | 1.1% | 0.085 |

What is claimed is:

1. A half mirror comprising a retardation layer, a circularly polarized light reflecting layer, and a front panel that are disposed in this order,
wherein the retardation layer has a front phase difference as measured at a wavelength of 500 nm of 107 to 127 nm and a front phase difference as measured at a wavelength of 475 nm of 110 to 130 nm,
the circularly polarized light reflecting layer includes three cholesteric liquid crystal layers,
the three cholesteric liquid crystal layers have different selective reflection center wavelengths $\lambda 1$, $\lambda 2$, and $\lambda 3$,
the center wavelengths $\lambda 1$, $\lambda 2$, and $\lambda 3$ satisfy 380 nm<$\lambda 1$<500 nm and 520 nm<$\lambda 2$<$\lambda 3$<780 nm, and
the cholesteric liquid crystal layer having the center wavelength $\lambda 1$ is disposed nearest to the front panel side.

2. The half mirror according to claim 1, wherein the center wavelength $\lambda 1$ satisfies 380 nm<$\lambda 1$<465 nm.

3. The half mirror according to claim 2, wherein a value of $(0.615X_{475}+0.763X_{480}0.900X_{485}+1.071X_{490}+1.335X_{495}+1.671X_{500})/100$ is 1.5% or less,
wherein $X_{475}$, $X_{480}$, $X_{485}$, $X_{490}$, $X_{495}$, and $X_{500}$ are reflectances at wavelengths of 475 nm, 480 nm, 485 nm, 490 nm, 495 nm, and 500 nm, respectively.

4. The half mirror according to claim 1, wherein a value of $(0.615X_{475}+0.763X_{480}0.900X_{485}+1.071X_{490}+1.335X_{495}+1.671X_{500})/100$ is 1.5% or less,
wherein $X_{475}$, $X_{480}$, $X_{485}$, $X_{490}$, $X_{495}$, and $X_{500}$ are reflectances at wavelengths of 475 nm, 480 nm, 485 nm, 490 nm, 495 nm, and 500 nm, respectively.

5. The half mirror according to claim 4, wherein reflectances at the center wavelengths $\lambda 1$, $\lambda 2$ and $\lambda 3$ are each 35% or more.

6. The half mirror according to claim 4, wherein the circularly polarized light reflecting layer and the retardation layer are in direct contact with each other.

7. The half mirror according to claim 4, wherein the three cholesteric liquid crystal layers are each in direct contact with their adjacent cholesteric liquid crystal layers.

8. The half mirror according to claim 4, wherein the front panel is a glass plate or a plastic film having a front phase difference of less than 10 nm, and the circularly polarized light reflecting layer and the front panel are bonded together with an adhesive layer interposed therebetween.

9. The half mirror according to claim 4, wherein the circularly polarized light reflecting layer includes a cholesteric liquid crystal layer having a selective reflection center wavelength in the infrared range.

10. A mirror with an image display function, comprising the half mirror according to claim 4 and an image display device, wherein the image display device, the retardation layer, the circularly polarized light reflecting layer, and the front panel are disposed in this order.

11. The half mirror according to claim 1, wherein reflectances at the center wavelengths $\lambda 1$, $\lambda 2$, and $\lambda 3$ are each 35% or more.

12. The half mirror according to claim 1, wherein the circularly polarized light reflecting layer and the retardation layer are in direct contact with each other.

13. The half mirror according to claim 1, wherein the three cholesteric liquid crystal layers are each in direct contact with their adjacent cholesteric liquid crystal layers.

14. The half mirror according to claim 1, wherein the front panel is a glass plate or a plastic film having a front phase difference of less than 10 nm, and the circularly polarized light reflecting layer and the front panel are bonded together with an adhesive layer interposed therebetween.

15. The half mirror according to claim 1, wherein the circularly polarized light reflecting layer includes a cholesteric liquid crystal layer having a selective reflection center wavelength in the infrared range.

16. A mirror with an image display function, comprising the half mirror according to claim 1 and an image display device, wherein the image display device, the retardation layer, the circularly polarized light reflecting layer, and the front panel are disposed in this order.

17. The mirror with an image display function according to claim 16, wherein the image display device and the retardation layer are bonded together with an adhesive layer interposed therebetween.

* * * * *